United States Patent
Vitebsky et al.

(10) Patent No.: US 8,638,662 B2
(45) Date of Patent: Jan. 28, 2014

(54) METHOD OF IMPLEMENTING PACKET-BASED RESOURCE ALLOCATION AND PERSISTENT RESOURCE ALLOCATION IN A WIRELESS COMMUNICATION SYSTEM

(75) Inventors: Stan Vitebsky, Morristown, NJ (US); Yang Yang, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 129 days.

(21) Appl. No.: 13/179,924

(22) Filed: Jul. 11, 2011

(65) Prior Publication Data

US 2011/0261789 A1 Oct. 27, 2011

Related U.S. Application Data

(63) Continuation of application No. 11/946,205, filed on Nov. 28, 2007, now Pat. No. 8,004,977.

(51) Int. Cl.
*H04Q 7/00* (2006.01)

(52) U.S. Cl.
USPC ........... 370/230; 370/253; 370/277; 370/329; 370/411; 455/450; 455/509

(58) Field of Classification Search
None
See application file for complete search history.

(56) References Cited

U.S. PATENT DOCUMENTS

| 8,004,977 B2 * | 8/2011 | Vitebsky et al. | 370/230 |
| 2008/0101286 A1 * | 5/2008 | Wang et al. | 370/329 |
| 2008/0267118 A1 * | 10/2008 | Cai et al. | 370/329 |

\* cited by examiner

*Primary Examiner* — Chi Pham
*Assistant Examiner* — Shick Hom

(57) ABSTRACT

The present invention provides a method of allocating resources in a wireless communication system. The method includes requesting persistent allocation of resources for a data spurt in response to detecting the beginning of the data spurt and performing non-persistent resource allocation for at least one packet in the data spurt. The non-persistent resource allocation is performed in response to determining that persistent resources are not available for allocation. The method also includes transmitting the packet using the allocated non-persistent resources.

16 Claims, 4 Drawing Sheets

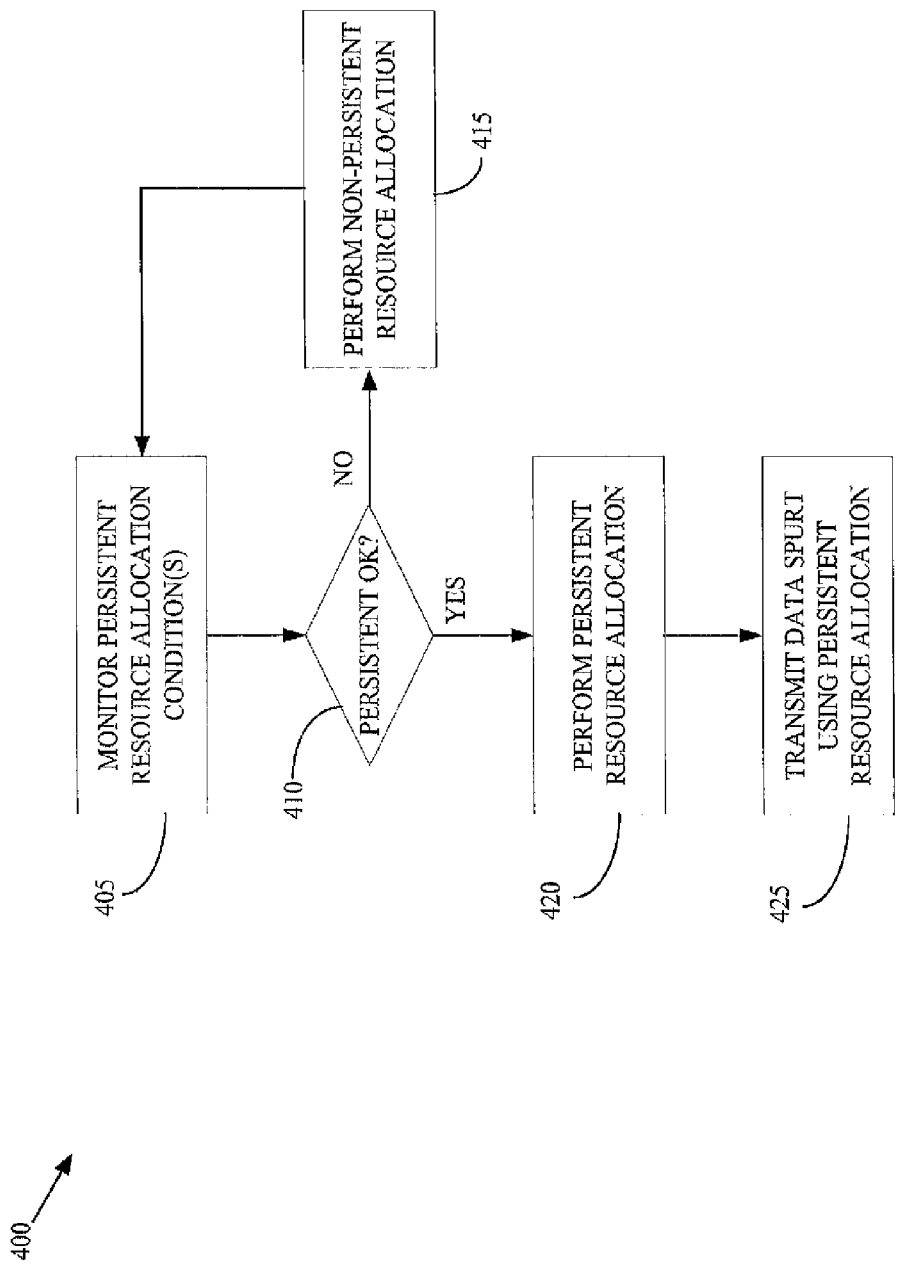

METHOD OF IMPLEMENTING PACKET-BASED RESOURCE ALLOCATION AND PERSISTENT RESOURCE ALLOCATION IN A WIRELESS COMMUNICATION SYSTEM

This is a continuation of application Ser. No. 11/946,205 filed Nov. 28, 2007 now U.S. Pat. No. 8,004,997.

BACKGROUND OF THE INVENTION

1. Field of the Invention

This invention relates generally to communication systems, and, more particularly, to wireless communication systems.

2. Description of the Related Art

Conventional wireless communication systems include a network of base stations, base station routers, and/or other wireless access points that are used to provide wireless connectivity to mobile units in geographic areas (or cells) associated with the network. Information may be communicated between the network and the mobile units over an air interface using wireless communication links that typically include multiple channels. The channels include forward link (or downlink) channels that carry signals from the base stations to the mobile units and reverse link (or uplink) channels that carry signals from the mobile units to the base station. The channels may be defined using a time slots, frequencies, scrambling codes or sequences, or any combination thereof. For example, the channels in a Code Division Multiple Access (CDMA) system are defined by modulating signals transmitted on the channels using orthogonal codes or sequences. For another example, the channels in an Orthogonal Frequency Division Multiplexing (OFDM) system are defined using a set of orthogonal frequencies known as tones or subcarriers.

Next (4th) generation wireless systems such as 802.16e WiMAX, UMTS Long Term Evolution (LTE) and cdma2000 EV-DO Revision C Ultra Mobile Broadband (UMB) are based on Orthogonal Frequency Division Multiple Access. In OFDMA, the transmitted signal consists of narrowband tones that are nearly orthogonal to each other in the frequency domain. A group of tones transmitted over the duration of one time slot (or frame) constitutes the smallest scheduling resource unit, also known as a "tile," a resource block (RB), or a base node (BN). Different tones belonging to a tile may be scattered across the entire carrier frequency band used by the OFDMA system so that each tile transmission experiences diversified channels and interference on each sub-carrier. Alternatively, a tile can be formed of a contiguous set of tones so that the channel and interference experienced by the tile are more localized. Hybrid Automatic Repeat reQuest (HARQ) is employed to increase the capacity of the OFDMA system. To this end, the encoder packet transmission includes multiple HARQ interlaces repeating every certain number of frames and having a fixed maximum allowed number of sub-packet retransmissions. In systems such as UMB that employ synchronous HARQ, a scheduler allocates tile-interlace resources for the duration of each encoder packet transmission. This approach is conventionally referred to as "packet-based" allocation.

OFDMA is a fully scheduled medium access control scheme on both the uplink and downlink channels and therefore requires explicit signaling to assign resources to user data transmissions. Since the resources allocated to each packet can differ, packet-based resource allocation requires signaling overhead for each packet. The signaling overhead needed to provide this assignment can consume a significant amount of bandwidth and/or power, especially when the system supports a large number of relatively low rate applications such as Voice over Internet Protocol (VoIP). One alternative to the packet-based resource allocation scheme is persistent resource assignment. In a persistent resource allocation scheme, channel resources (such as frequency tones and/or HARQ interlaces) are assigned for the duration of a voice talk spurt instead of being assigned for each individual VoIP packet transmission. Persistent resource allocation relies upon the well-known property that conversational voice traffic is generated in talk spurt followed by periods of silence that correspond to a listening mode. The average duration of a talk spurt is around 1-2 seconds and therefore consists of many VoIP packets, which are generated every 20 ms in the case of a CDMA2000 EVRC vocoder. Since signaling overhead is only required at the beginning of the talk spurt when the persistent resource allocation is performed, the overhead for talk spurt assignment is significantly lower than the overhead required for packet-based resource allocation.

However, persistent resource allocation has a number of drawbacks. For example, allocation of resources to a talk spurt may be delayed because traffic resources that could be assigned persistently to the new talk spurt on a sustained basis may not be available. For another example, the radiofrequency conditions associated with the user requesting the persistent resource allocation may require the use of multiple contiguous tiles (also known as OFDMA base nodes or resource blocks) across different interlaces. However, only non-contiguous resources may be available at the time of talk spurt arrival. The decision to assign persistent resources may also require more time because the scheduler may need to consider factors that are not as important in packet-based resource allocation. Exemplary factors that may be considered during persistent resource allocation include resource balancing, overload control, and the impact of persistent resource assignment on the quality of service of existing users. Furthermore, system outage and dynamic optimization of available traffic resources should be performed because the scheduling decision for persistent resource assignment is made for substantial periods of time instead of on a packet-by-packet basis. Non-persistent assignments typically ignore or greatly simplify these considerations.

The delay in assigning persistent resources may degrade the quality of service perceived by users. For example, if the start of the talk spurt is delayed beyond a certain bound, the users participating in the conversation will not have a natural experience when they try to interrupt each other. For example, the delay may cause the talking user to believe that the listening user has not heard what the talking user said, which may cause the talking user to repeat what they have said. The listening user may also respond later than expected, causing the users to believe that they are talking at the same time. Controlling the latency of the voice packets at the start of the new talk spurt is more important than the latency of the other packets in the middle of the talk spurt. For example, when the start of a new talk spurt is delayed, the jitter and/or packet inter-arrival requirements for subsequent packets may make it difficult to correct for the initial delay before the end of the talk spurt.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for allocating resources in a wireless communication system. The method includes requesting persistent allocation of resources for a data spurt in response to detecting the beginning of the data spurt and performing non-persistent resource allocation for at least one packet in the data spurt. The non-persistent resource allocation is performed in response to determining that persistent resources are not available for allocation. The method also includes transmitting the packet using the allocated non-persistent resources.

BRIEF DESCRIPTION OF THE DRAWINGS

The invention may be understood by reference to the following description taken in conjunction with the accompanying drawings, in which like reference numerals identify like elements, and in which:

FIG. 4 conceptually illustrates one exemplary embodiment of a method of determining whether to initiate non-persistent resource allocation, in accordance with the present invention.

Figure 1:
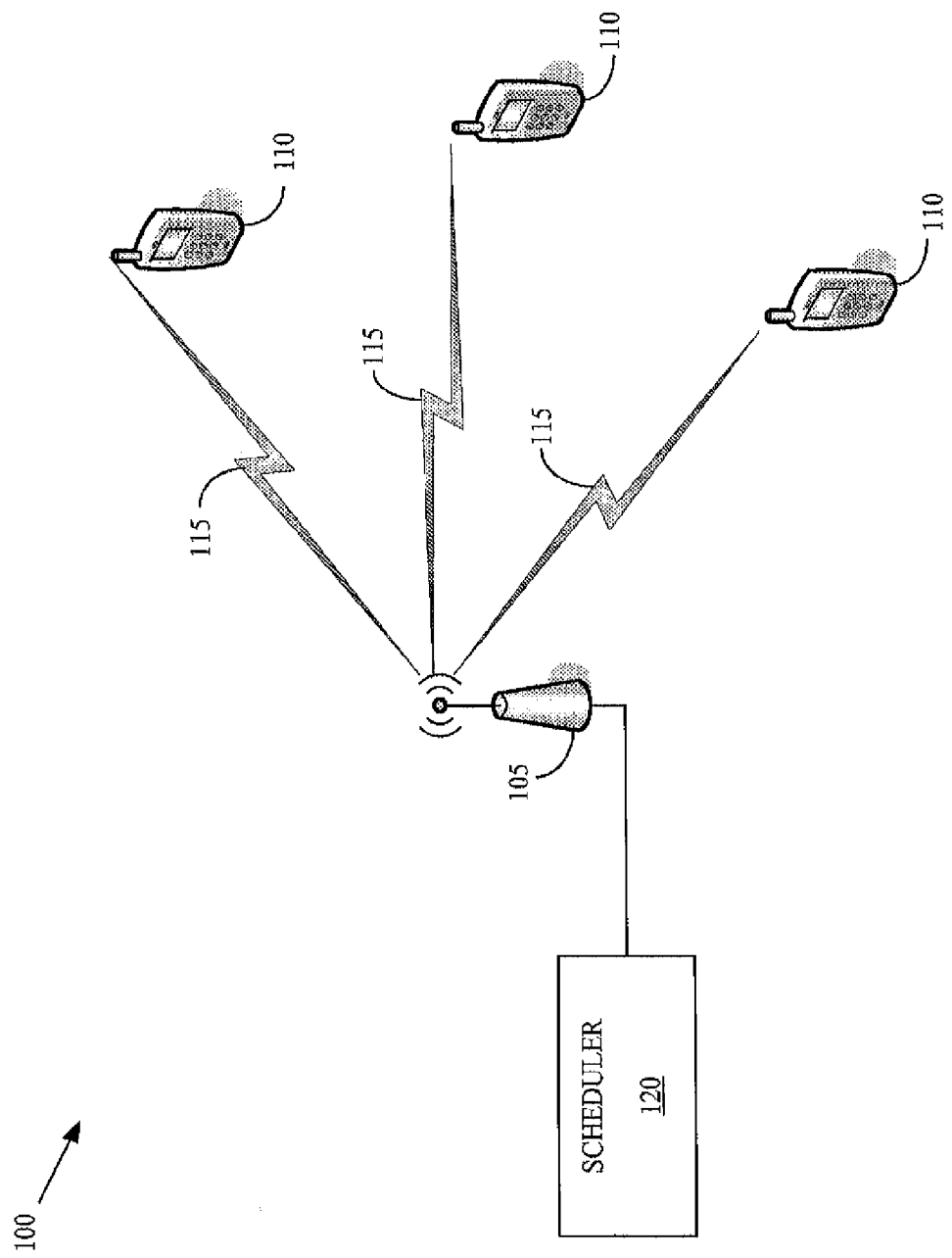
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes one or more base stations 105 that are used to provide wireless connectivity to one or more mobile units 110 over corresponding air interfaces 115. Wireless connectivity may be provided according to the standards and/or protocols defined for next (4th) generation wireless systems such as 802.16e WiMAX, UMTS Long Term Evolution (LTE) and cdma2000 EV-DO Revision C Ultra Mobile Broadband (UMB), which are based on Orthogonal Frequency Division Multiple Access (OFDMA) techniques that may implement Hybrid Automatic Repeat reQuest (HARQ) to increase the capacity of the OFDMA system. Techniques for implementing and/or operating systems that provide wireless connectivity according to next generation wireless standards and/or protocols are known in the art and in the interest of clarity only those aspects of implementing and/or operating the systems that are relevant to the present invention will be discussed herein. Furthermore, persons of ordinary skill in the art having benefit of the present disclosure should appreciate that the present invention is not limited to next generation wireless communication systems and/or systems that implement OFDMA. In alternative embodiments, the wireless communication system 100 may operate according to other standards and/or protocols.

The wireless communication system 100 also includes a scheduler 120 for scheduling the resources used for communication over the air interfaces 115. For example, the scheduler 120 may be used to allocate tiles, resource blocks (RBs), and/or base nodes (BNs) for communication over the air interfaces 115. The scheduler 120 may also determine whether the tones belonging to a tile are to be scattered across the entire carrier frequency band used by the OFDMA system 100 or are to be formed of a contiguous set of tones. In one embodiment, the scheduler 120 may be implemented within the base station 105. However, persons of ordinary skill in the art having benefit of the present disclosure should appreciate that in alternative embodiments the scheduler 120 may be implemented in any location or combination of locations. For example, the scheduler 120 may be implemented in a radio access network (not shown in FIG. 1) that is communicatively coupled to the base station 105.

The scheduler 120 is configured to perform non-persistent allocation of resources. As used herein and in accordance with common usage in the art, the phrase "non-persistent allocation of resources" will be understood to refer to techniques for allocating resources to a specific predetermined number of packets that are to be transmitted over the air interfaces 115. In one embodiment, the non-persistent allocation of resources is performed on a packet-by-packet basis so that resources are allocated separately and independently to each packet is transmitted over the air interfaces 115.

The scheduler 120 is also configured to perform persistent allocation of resources. As used herein and in accordance with common usage in the art, the phrase "persistent allocation of resources" will be understood to refer to techniques for allocating resources to a particular data stream and/or application for the duration of a data spurt generated by the application. For example, a VoIP application may generate a talk spurt that lasts for as long as a user continues to talk into a microphone, such as the microphones implemented in the mobile units 110. Persistent allocation of resources to this talk spurt allows the VoIP application to continue to transmit packets using the allocated resources for as long as the talk spurt Lasts without having to repeatedly request allocation of resources for each packet (or group of packets) in the talk spurt. Accordingly, persistent allocation is an open-ended allocation of the resources of the air interface 115 to a data stream and/or application. Other exemplary types of applications that may be allocated resources on a persistent basis include, but are not limited to, other voice applications, video telephony applications, push-to-talk applications, streaming video applications, constant bit rate applications, guaranteed bit rate applications, and the like.

Resources may not always be available for allocation on a persistent or sustained basis. And even if the persistent resources are available, persistent allocation may require a significantly longer decision-making period than non-persistent allocation, which may lead to delays in initiating communication using persistently allocated resources. However, non-persistent resources may be available, e.g., because other users on the carrier are utilizing applications that do not require persistent assignment or because the persistent resources assigned to the other users are not used all the time. For example, allocated persistent resources may not be used due to HARQ early termination of packet transmissions on the persistently assigned channels. Accordingly, the scheduler 120 may elect to allocate non-persistent resources to packets associated with a data spurt when persistent resources are unavailable or when the scheduler determines that the persistent resource allocation may be delayed more than a predetermined length of time. Alternatively, the scheduler 120 may select between allocating persistent and non-persistent resources to packets based on the overhead associated with the persistent and non-persistent resource allocations.

Figure 2:
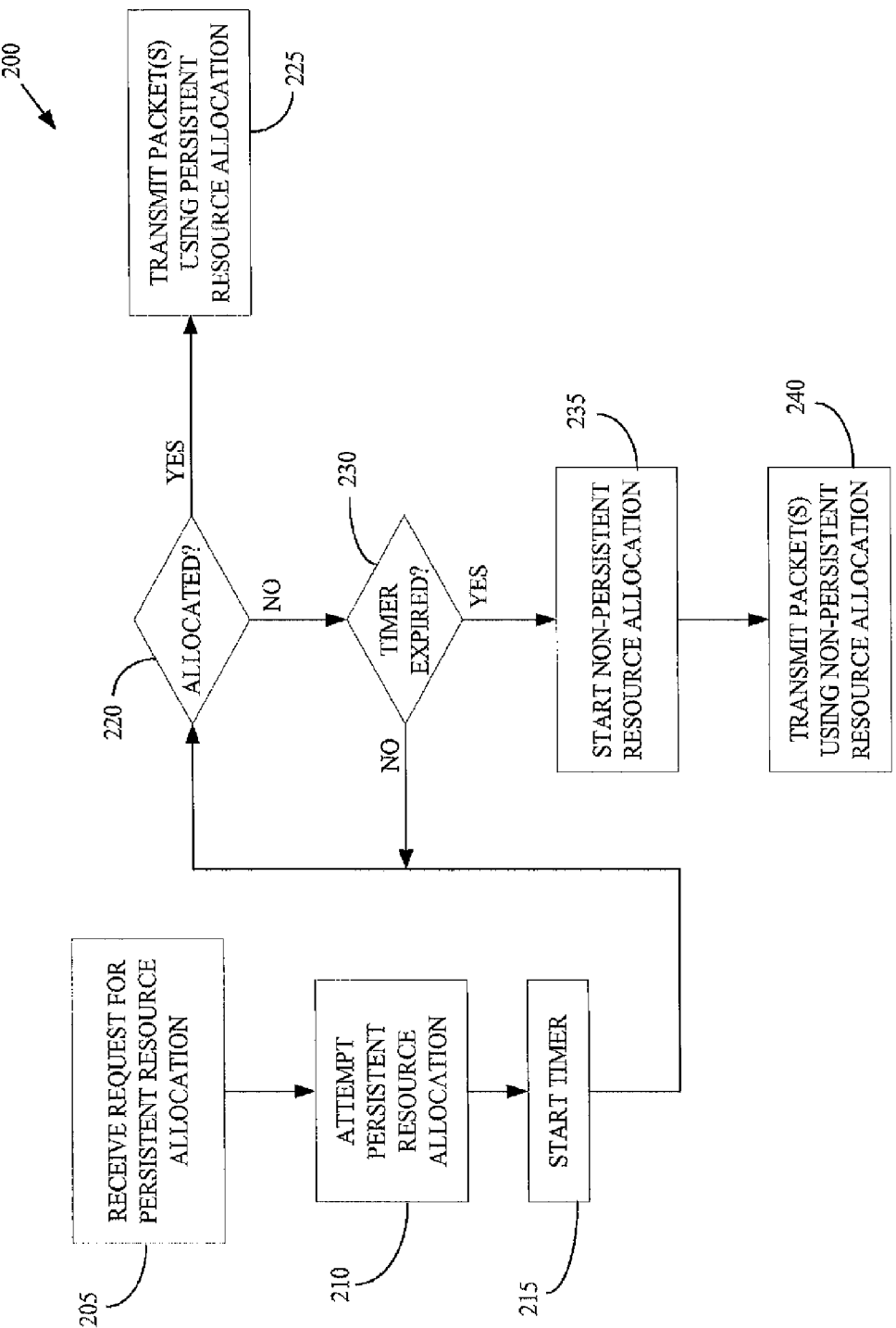
FIG. 2 conceptually illustrates a first exemplary embodiment of a method of determining whether to use persistent or non-persistent resource allocation, in accordance with the present invention.

FIG. 2 conceptually illustrates a first exemplary embodiment of a method 200 of determining whether to use persistent or non-persistent resource allocation. In the illustrated embodiment, a scheduling entity receives (at 205) a request for persistent resource allocation. For example, a data spurt associated with an application may be ready for transmission over an air interface and so the scheduling entity may receive (at 205) a request to allocate persistent resources to the data spurt. For another example, the scheduling entity may receive (at 205) the request for persistent resource allocation in response to a mobile unit handing off from a source base station to a target base station associated with the scheduling entity. In response to receiving (at 205) the request, the scheduling entity may attempt (at 210) persistent allocation of resources. The scheduling entity may also start (at 215) a timer that is used to determine how much time has elapsed between the request for persistent resource allocation and actual allocation of the resources.

The scheduling entity may then determine (at 220) whether or not the persistent resources have been successfully allocated. If the scheduling entity determines (at 220) that the persistent resources have been successfully allocated to the data spurt, then packets from the data spurt may be transmitted (at 225) over the air interface using the persistently allocated resources. If the persistent resources have not yet been successfully allocated, then the scheduling entity may determine (at 230) whether or not the timer has expired. In various alternative embodiments, the expiration time of the timer may be determined based upon criteria including a maximum number of packets from the data spurt that can be stored in a queue or a target packet latency associated with the packets in the data spurt. The scheduling entity continues to monitor (at 220) the allocation of the persistent resources if the timer has not yet expired. However, if the timer expires (at 230), then the scheduling entity may use expiration of the timer as an indication that the persistent resources are unavailable and so persistent resource allocation has been unsuccessful or has been delayed an undesirably large amount of time. Although the illustrated embodiment uses expiration of the timer to indicate unsuccessful persistent resource allocation, persons of ordinary skill in the art having benefit of the present disclosure should appreciate that other techniques may be used to determine that persistent resources may be unavailable so that persistent resource allocation was unsuccessful and/or to predict that persistent resource allocation will not be possible within the desired time.

The scheduling entity performs (at 235) non-persistent resource allocation for packets in the data spurt when it determines that persistent resource allocation has been (or will likely be) unsuccessful and/or delayed. For example, non-persistent resources may be allocated on a packet-by-packet basis to packets that are stored in a queue and awaiting transmission over the air interface. These packets may then be scheduled for transmission and/or transmitted (at 240) over the air interface using the non-persistent resource allocation. Concurrently with transmission (at 240) of packets over the air interface, the scheduling entity may continue to evaluate the conditions for completing persistent allocation of resources to the data spurt. Once the system determines that persistent resources can be allocated to the data spurt, the system may stop using non-persistent allocations for the data spurt and switch the traffic towards persistent resources.

Figure 3:
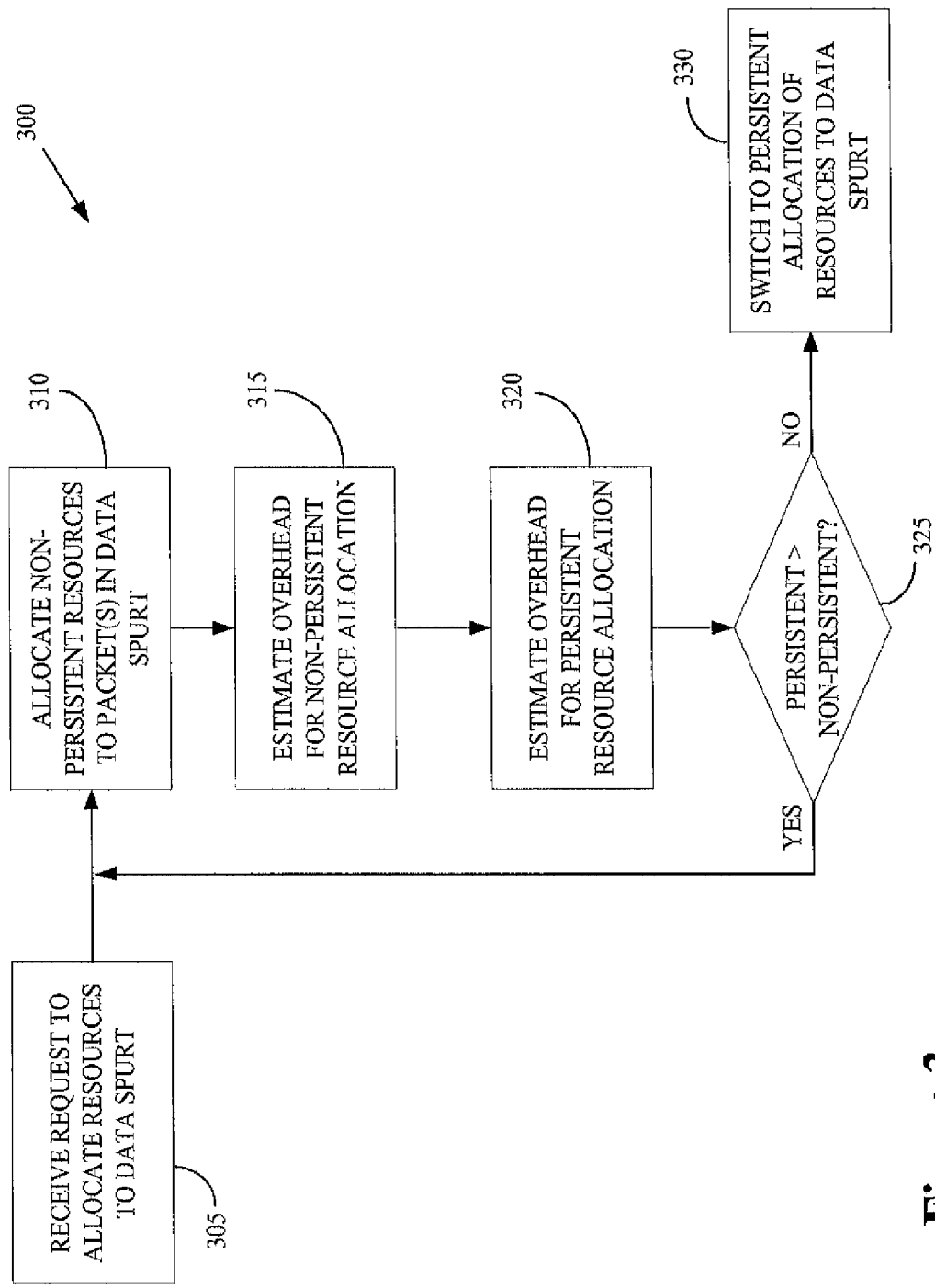
FIG. 3 conceptually illustrates a second exemplary embodiment of a method of determining whether to use persistent or non-persistent resource allocation, in accordance with the present invention.

FIG. 3 conceptually illustrate a second exemplary embodiment of a method 300 of determining whether to use persistent or non-persistent resource allocation. In the illustrated embodiment, a scheduling entity receives (at 305) a request to allocate resources to a data spurt. In response to receiving (at 305) the allocation request, the scheduling entity allocates (at 310) non-persistent resources to one or more packets in the data spurt. The packets may then be transmitted using the allocated non-persistent resources. The scheduling entity estimates (at 315) the overhead associated with non-persistent resource allocation. For example, the scheduling entity may estimate (at 315) the signaling overhead necessary to continue non-persistent allocation of resources to the packets in the data spurt. The scheduling entity also estimates (at 320) the overhead required for persistent resource allocation. The scheduling entity may also estimates (at 320) the amount of resources that would be unused if a persistent assignment had been made. Although FIG. 3 depicts the two estimation steps as occurring sequentially, persons of ordinary skill in the art having benefit of the present disclosure should appreciate that the estimations (at 315, 320) may occur in any order and/or concurrently.

The scheduling entity may then use the estimated overhead values (and/or the estimate of the unused resources) to determine (at 325) whether a persistent allocation of the resources results in a larger overhead than non-persistent allocation. If the overhead associated with persistent allocation is larger than the overhead associated with non-persistent allocation, the scheduling entity may continue to allocate (at 310) non-persistent resources to packets in the data spurt. If the overhead associated with persistent allocation is smaller than the overhead associated with non-persistent allocation, the scheduling entity may switch (at 330) from a non-persistent allocation to persistent allocation. In one embodiment, the decision (at 325) may include a hysteresis to reduce the likelihood that the scheduling entity will flip-flop between persistent and non-persistent allocation. As discussed herein, the switch (at 330) may include a period during which persistent and non-persistent allocation is used concurrently. Furthermore, although the embodiment shown in FIG. 3 initially allocates resources using non-persistent resource allocation, the present invention is not so limited. In alternative embodiments, the scheduling entity may initially use persistent allocation and may then use the comparison of the overhead associated with persistent and non-persistent allocation to determine whether to switch to non-persistent allocation.

FIG. 4 conceptually illustrates one exemplary embodiment of a method 400 of determining whether to initiate non-persistent resource allocation. In the illustrated embodiment, a scheduling entity has begun allocating non-persistent resources to packets associated with a data spurt. Concurrently with allocation of the non-persistent resources and/or transmission of the packets using the non-persistent resources, the scheduling entity continues to monitor (at 405) conditions associated with a persistent resource allocation, such as availability of persistent and/or non-persistent resources, the overhead associated with the persistent and/or non-persistent resource allocation, and the like. For example, the scheduling entity may monitor (at 405) whether or not persistent resources have become available for allocation to the data spurt. As long as the scheduling entity determines (at 410) that persistent resources are not available for allocation to the data spurt, the scheduling entity continues to perform (at 415) non-persistent resource allocation and monitor (at 405) the conditions for persistent resource allocation. If the scheduling entity determines (at 410) that persistent resources have become available for allocation to the data spurt, then the scheduling entity may perform (at 420) persistent resource allocation to the data spurt. Packets from the data spurt may then be scheduled for transmission and/or transmitted (at 425) using the allocated persistent resources. In one embodiment, the seamless switching from non-persistent resources to persistent resources is possible because the association of the packets to the same traffic flow is done at a higher protocol level (e.g., the RLC/RLP, RTCP, or Application layers) than the protocol level used for resource management (e.g., the Medium Access Control layer).

Persistent and non-persistent resources may also be allocated concurrently to different portions of the data spurt. Switching from non-persistent resources to persistent resources may then be done gradually once the persistent resources become available. In one embodiment, persistent resources and non-persistent resources may be used concurrently in order to reduce the accumulation of packets in the queue that are waiting for assignment and/or resource allocation. The use of non-persistent resources may be abandoned once the queue occupancy has been reduced to a level that is appropriate for providing a target packet latency on a sustained basis with persistent resources. However, if the need to use non-persistent resources arises during a data spurt that is utilizing persistent resource allocation, e.g., due to an increase in occupancy of the queue, the system may again use persistent and non-persistent resources in parallel until conditions sufficient for the use of persistent resources alone are achieved. For another example, non-persistent and persistent resource allocation may be used concurrently following a handoff until the new (target) cell performs persistent allocation of resources to the data spurt and/or until one or more packet queues caused by the gap in transmission associated with the handoff have been relieved to the degree that the call can continue to be served using only the persistent resources.

Embodiments of the techniques described herein may have a number of advantages over conventional practice in which systems implement either persistent or non-persistent resource allocation. For example, embodiments of the techniques described herein may combine the benefits of persistent and non-persistent resource allocation while mitigating many of the drawbacks of using either of these techniques independently. The reduced signaling overhead associated with persistent allocation may be achieved when conditions are conducive to using persistent resource allocation and the flexibility and good latency performance of non-persistent resource allocation may be achieved when conditions are not conducive to using persistent resource allocation. The techniques described herein may also improve VoIP latency performance, particularly during handoff and/or cell switching within an active data spurt.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A scheduler for use in a wireless communication system comprising: one or more processors having; the scheduler being configured to:
   receive requests for persistent allocation of resources for a data spurt in response to determining that the data spurt is ready for transmission over an air interface; and
   perform non-persistent resource allocation for at least one packet in the data spurt in response to determining that persistent resources are not available for allocation, wherein determining that persistent resources are not available for allocation comprises determining that an elapsed time since detection of the beginning of the data spurt has exceeded a predetermined threshold value prior to the persistent allocation of the resources.

2. A scheduler for use in a wireless communication system comprising: one or more processors having; the scheduler being configured to:
   receive requests for persistent allocation of resources for a data spurt in response to determining that the data spurt is ready for transmission over an air interface; and
   perform non-persistent resource allocation for at least one packet in the data spurt in response to determining that persistent resources are not available for allocation, wherein determining that persistent resources are not available for allocation comprises determining that an overhead associated with persistent resource allocation is larger than an overhead associated with non-persistent resource allocation.

3. The scheduler of claim 1 or 2, wherein the scheduler is configured to receive requests for persistent allocation of resources for the data spurt provided by at least one of a voice application, a Voice over Internet Protocol (VoIP) application, a video telephony application, a push-to-talk application, a streaming video application, a constant bit rate application, or a guaranteed bit rate application.

4. The scheduler of claim 1 or 2, wherein the scheduler is configured to receive requests for at least one of a timeslot, frequency, code sequence, tone, sub-carrier, tile, resource block, base node, or power.

5. The scheduler of claim 1 or 2, wherein the scheduler is configured to:
   perform persistent resource allocation for the data spurt; and
   switch from persistent resource allocation to non-persistent resource allocation in response to determining that an overhead associated with persistent resource allocation is larger than an overhead associated with non-persistent resource allocation.

6. The scheduler of claim 1 or 2, wherein the scheduler is configured to determine whether resources for the data spurt can be persistently allocated.

7. The scheduler of claim 6, wherein the scheduler is configured to determine that resources for the data spurt can be persistently allocated when an overhead associated with persistent allocation is less than an overhead associated with non-persistent allocation.

8. The scheduler of claim 6, wherein the scheduler is configured to monitor at least one condition for completing the persistent allocation and determine whether said at least one condition for completing the persistent allocation is satisfied.

9. The scheduler of claim 7, wherein the scheduler is configured to monitor said at least one condition concurrently with performing the non-persistent resource allocation for said at least one packet and transmitting said at least one packet using the allocated non-persistent resources.

10. The scheduler of claim 6, wherein the scheduler is configured to perform persistent allocation of resources to the data spurt so that at least a portion of the data spurt can be transmitted using the persistently allocated resources.

11. The scheduler of claim 10, wherein the scheduler is configured to end non-persistent allocation of resources to packets in the data spurt.

12. The scheduler of claim 11, wherein the scheduler is configured to perform persistent allocation of resources concurrently with non-persistent allocation of resources for a selected period of time prior to ending non-persistent allocation of resources.

13. The scheduler of claim 12, wherein the scheduler is configured to select the period of time for concurrent persistent and non-persistent allocation of resources.

14. The scheduler of claim 13, wherein the scheduler is configured to select the period of time based upon at least one of a number of packets in a queue or a target packet latency.

15. The scheduler of claim 6, wherein the scheduler is configured to:
   monitor at least one condition for completing the persistent allocation;
   determine that said at least one condition for completing the persistent allocation is not satisfied; and
   resume non-persistent allocation of resources to at least one packet in the data spurt in response to determining that said at least one condition for completing the persistent allocation is not satisfied.

16. The scheduler of claim 1 or 2, wherein the scheduler is configured to detect the beginning of the data spurt in response to initiation of a new data spurt, initiation of an application that provides the data spurt, or handoff of a communication session.

* * * * *